United States Patent
Yoon et al.

(10) Patent No.: US 9,090,840 B2
(45) Date of Patent: Jul. 28, 2015

(54) HYDROGEN SULFIDE AND CARBONYL SULFIDE REMOVAL APPARATUS USING MICROWAVE PLASMA, AND METHOD THEREOF

(71) Applicant: KOREA INSTITUTE OF ENERGY RESEARCH, Daejeon (KR)

(72) Inventors: Sang Jun Yoon, Daejeon (KR); Jae Goo Lee, Daejeon (KR); Yong Ku Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 14/062,490

(22) Filed: Oct. 24, 2013

(65) Prior Publication Data
US 2014/0069011 A1    Mar. 13, 2014

Related U.S. Application Data

(62) Division of application No. 13/606,396, filed on Sep. 7, 2012, now abandoned.

(51) Int. Cl.
| | | |
|---|---|---|
| *C10K 1/00* | (2006.01) | |
| *C10K 3/00* | (2006.01) | |
| *C10L 3/10* | (2006.01) | |
| *C01B 17/04* | (2006.01) | |
| *B01D 53/32* | (2006.01) | |

(52) U.S. Cl.
CPC ............... *C10K 1/004* (2013.01); *B01D 53/32* (2013.01); *C01B 17/0495* (2013.01); *C10K 3/001* (2013.01); *C10L 3/103* (2013.01); *B01D 2256/24* (2013.01); *B01D 2257/304* (2013.01); *B01D 2257/308* (2013.01); *B01D 2259/806* (2013.01); *B01D 2259/818* (2013.01)

(58) Field of Classification Search
CPC ........ C10K 1/004; C10K 3/001; C10L 3/103; C01B 17/0495; B01D 53/32; B01D 2256/24; B01D 2257/304; B01D 2257/308; B01D 2259/806; B01D 2259/818
USPC .............................................. 422/186, 128.29
See application file for complete search history.

(56) References Cited

U.S. PATENT DOCUMENTS

| | | | | |
|---|---|---|---|---|
| 5,211,923 | A | * | 5/1993 | Harkness et al. ............. 423/220 |
| 6,362,449 | B1 | | 3/2002 | Hadidi et al. |

(Continued)

FOREIGN PATENT DOCUMENTS

CN    101829487 A    9/2010

OTHER PUBLICATIONS

Office Action issued in Chinese Patent Application No. 201210331606.4 on Jan. 30, 2015 along with English translation, 19 pages.

(Continued)

*Primary Examiner* — Kishor Mayekar
(74) *Attorney, Agent, or Firm* — Rothwell, Figg, Ernst & Manbeck, P.C.

(57) ABSTRACT

A hydrogen sulfide and carbonyl sulfide removal method using microwave plasma comprising a hydrogen sulfide and carbonyl sulfide containing mixed-gas supplying step, a microwave supplying step, a plasma flame forming step, a hydrogen sulfide and carbonyl sulfide decomposing step in which hydrogen sulfide and the carbonyl sulfide are dissociated into atomic units, a rebinding step in which atomic units are rebound so that combustible gases are generated, and a separately collecting step in which the gases are separated and then are separately collected.

3 Claims, 6 Drawing Sheets

(56) References Cited

U.S. PATENT DOCUMENTS

2005/0191237 A1* 9/2005 Selinger et al. ............ 423/658.2
2012/0027955 A1   2/2012 Sunkara et al.

OTHER PUBLICATIONS

Dong et al.: "Hydrogen Production by H2S Microwave Plasma Dissociation," Acta Energiae Solaris Sinica, vol. 18, No. 2, pp. 142-145.

* cited by examiner

HYDROGEN SULFIDE AND CARBONYL SULFIDE REMOVAL APPARATUS USING MICROWAVE PLASMA, AND METHOD THEREOF

CROSS REFERENCE TO RELATED APPLICATIONS

The present application is a divisional of U.S. patent application Ser. No. 13/606,396, filed on Sep. 7, 2012, the entire disclosure of which is incorporated herein by reference.

BACKGROUND OF THE INVENTION

1. Field of the Invention

The present invention relates to a hydrogen sulfide and carbonyl sulfide removal apparatus using microwave plasma, and a method thereof. More particularly, the present invention relates to an apparatus and a method for removing poisonous gases, such as hydrogen sulfide ($H_2S$) and carbonyl sulfide (COS), contained in natural gas, refined crude oil refinery gas, gasified synthetic gas, etc. by using microwave plasma, and generating elemental sulfur and hydrogen from the gases.

Especially, in the hydrogen sulfide and carbonyl sulfide removal apparatus using the microwave plasma, and the method thereof, since a synthetic gas, prepared through a synthetic gas preparation process in which under a reduced atmosphere, a sulfur-containing hydrocarbon material is partially oxidized by being mixed with steam or oxygen, includes large amounts of hydrogen sulfide and carbonyl sulfide, in order to remove the hydrogen sulfide and the carbonyl sulfide, gases of the hydrogen sulfide and the carbonyl sulfide are decomposed into elemental sulfur (S) and hydrogen ($H_2$) by atmospheric plasma. Then, the decomposed elemental sulfur and the decomposed hydrogen are separately collected by a cyclone, thereby simplifying an additional step for collecting a combustible gas and elemental sulfur. Thus, it is possible to improve processing efficiency and economic efficiency.

2. Description of the Prior Art

Plasma, called the fourth state of matter, is an ionized gas where electrons and atomic nuclei are separated. While the plasma is formed, a large amount of radicals capable of activating a chemical reaction are formed. Plasma may be largely divided into low temperature plasma and high temperature plasma. The low temperature plasma may be used in the field requiring a chemical reaction at a low temperature of 100° C. or less. The high temperature plasma may be applied to the fields, such as incineration, and dissolution, requiring a high temperature because in the high temperature plasma, a temperature of 5000° C. or more can be reached in a short time. Also, application of the high temperature plasma technology in various fields from simple technologies such as incineration, and combustion to gasification technologies with processing efficiency and variable uses of generated gas have been recently researched. At present, the most widely used plasma method is a torch method using arc discharge. However, this method has a limitation in electrode life span due to a high temperature occurring during discharge, and requires a high electric power due to requirement of a large amount of current. Further, when steam for gasification reaction is injected, the electrode life span can be reduced. Accordingly, research on a high temperature plasma application technology using microwaves has been recently conducted.

Meanwhile, gasification refers to a process of converting a hydrocarbon-based material into a combustible mixed-gas such as hydrogen, carbon monoxide and methane by reaction with a gasifying agent such as water vapor, oxygen, hydrogen, carbon dioxide gas. Herein, beside the combustible mixed-gas, impurities such as hydrogen sulfide, carbonyl sulfide, ammonia, ash, unreacted soot and tar are produced, and exist together with the combustible mixed-gas. Synthetic gas including hydrogen and carbon monoxide may be applied to hybrid power generation through a fuel cell, a gas engine and a steam turbine, liquid fuel production and chemical drug production, in which the above mentioned impurities have to be necessarily removed. Especially, since the gasification reaction is performed under a reduced atmosphere, main components of a sulfur compound within the synthetic gas are hydrogen sulfide and carbonyl sulfide. Such hydrogen sulfide and carbonyl sulfide not only corrode a device but also are very harmful to a human body. Thus, they have to be removed before having an effect on a gas engine, etc. or being discharged into air.

In a conventional synthetic gas desulfurization system, a wet refining method for absorbing and removing a sulfur compound by using an absorbing liquid at a low temperature has been practically used and applied. Herein, a general acidic gas removal system includes a sulfur compound absorption tower, and a sulfur compound stripping tower. In a case of carbonyl sulfide, due to its low water solubility, it is difficult to directly remove the carbonyl sulfide through the wet refining method. Thus, carbonyl sulfide is converted into hydrogen sulfide through a hydrogenation (hydrolysis) process, and then removed. The hydrogen sulfide is removed from synthetic gas by using absorbent. Then, the hydrogen sulfide removed in the absorption tower is stripped in a regeneration tower and transferred to a Claus process where the hydrogen sulfide is converted into elemental sulfur. The converted elemental sulfur is sold as a high value-added material used for producing sulfuric acid, medicines, cosmetics, fertilizer and rubber product raw materials.

In a case of electric power generation using synthetic gas, from the point of efficiency view, high power generation efficiency can be achieved when gas at a high temperature is supplied to a gas engine and combusted. Accordingly, it is preferable that synthetic gas generated from a gasification reactor is subjected to removal treatment of hydrogen sulfide at a temperature as high as possible before being used for power generation.

However, in a case of a conventional commercially available synthetic gas desulfurization technology, since an absorption process is performed at a low temperature of 50° C. or less, synthetic gas at a relatively low temperature is supplied. Thus, power generation efficiency is low, three or more processes such as a hydrogenation process, an absorption tower, a regeneration tower for absorbent, and a Claus process for generating elemental sulfur are required, and the absorbent has to be periodically supplemented. In other words, the technology has a disadvantage in that a high process cost and a high amount of energy are required. Further, while the sulfur absorbent is in contact with the synthetic gas, a part of the absorbent may be scattered. Then, the scattered absorbent may be included in the synthetic gas and flowed into the gas engine, thereby causing gas engine corrosion and air pollution.

Accordingly, it is required to research a novel method for improving economic efficiency and removal efficiency of hydrogen sulfide gas by simplifying the above processes.

SUMMARY OF THE INVENTION

Accordingly, the present invention has been made to solve the above-mentioned problems occurring in the prior art, and an object of the present invention is to provide a hydrogen sulfide and carbonyl sulfide removal apparatus using microwave plasma, and a method thereof, in which a synthetic gas including hydrogen sulfide and carbonyl sulfide, produced by a gasification process, is brought into contact with plasma flame at a high temperature, and then the hydrogen sulfide is decomposed into elemental sulfur (S) and hydrogen ($H_2$), the carbonyl sulfide is decomposed into elemental sulfur (S) and carbon monoxide (CO), and the elemental sulfur, the hydrogen, and the carbon monoxide, decomposed as above, are separated by a cyclone or a gravity separator. Thus, an additional process for collecting a combustible gas and high value-added elemental sulfur is simplified, thereby reducing a facility cost and improving processing efficiency.

In order to accomplish this object, there is provided a hydrogen sulfide and carbonyl sulfide removal apparatus using microwave plasma, wherein a synthetic gas generated from gasification of hydrocarbon fuel containing sulfur is supplied to the apparatus, and hydrogen sulfide and carbonyl sulfide included within the synthetic gas are decomposed and removed under microwave plasma flame at high temperature, the apparatus including: a sulfur compound supply chamber, a vertical pipe, to which the synthetic gas including the hydrogen sulfide and the carbonyl sulfide and a plasma generating gas are supplied; a plasma generating device for moving microwaves generated from a waveguide, a horizontal pipe, to a portion communicated to the sulfur compound supply chamber, dissociating the supplied plasma generating gas by increasing an electric field through high-density condensation of the microwaves, and forming plasma flame by plasma discharge, an end upper portion of the waveguide being communicated with the sulfur compound supply chamber; a plasma decomposition chamber, a vertical pipe, which is communicated with an end lower portion of the waveguide of the plasma generating device and is connected on the same axis as that of the sulfur compound supply chamber, wherein within the plasma decomposition chamber, the plasma flame is positioned where the supplied sulfur compound is put and decomposed in the plasma flame; a rebinding chamber, a vertical pipe, which is communicatedly combined with a lower end of the plasma decomposition chamber, wherein from among elements of the sulfur compound decomposed by the plasma flame, hydrogen, and carbon monoxide are separated from sulfur; a cyclone for separating a synthetic gas as a combustible gas, and solid sulfur, which is provided at a lower end of the rebinding chamber; and a synthetic gas collecting tank and a sulfur collecting tank for collecting the synthetic gas and the solid sulfur separated by the cyclone, respectively.

In accordance with another aspect of the present invention, there is provided a hydrogen sulfide and carbonyl sulfide removal method using the apparatus according to the present invention, the method including: a hydrogen sulfide and carbonyl sulfide containing mixed-gas supplying step, in which a mixed-gas including a plasma generating gas with a synthetic gas including hydrogen sulfide and carbonyl sulfide is swirlingly supplied into the sulfur compound supply chamber; a microwave supplying step, in which microwaves generated from a plasma generating device are supplied to the supplied mixed-gas; a plasma flame forming step, in which, by an electric field of the supplied microwaves, molecules of the plasma generating gas in the mixed-gas are dissociated and form plasma flame by plasma discharge; a sulfur compound decomposing step, in which, while the synthetic gas including the hydrogen sulfide and the carbonyl sulfide is passed through the plasma flame, the hydrogen sulfide and the carbonyl sulfide are dissociated into atomic units such as sulfur, hydrogen, and carbon monoxide; a rebinding step, in which the hydrogen and the carbon monoxide, dissociated above, are rebound so that combustible gases of the hydrogen, and the carbon monoxide are generated, and the sulfur in a solid state is cohered; and a separately collecting step, in which the gases of the hydrogen and carbon monoxide and the solid sulfur are separated by a cyclone, and then are separately collected, respectively.

As described above in detail, in the inventive hydrogen sulfide and carbonyl sulfide removal apparatus using microwave plasma and the method thereof, the synthetic gas including gases of hydrogen sulfide and carbonyl sulfide is passed through a high temperature plasma area at 3000° C. or more, without oxygen, while a sulfur compound can be decomposed into atomic units without loss of combustible gases such as hydrogen, carbon monoxide, methane within the synthetic gas. In a rebinding step, atoms with a stronger binding force, such as hydrogen, and carbon monoxide, are firstly bound, thereby generating gases of hydrogen and carbon monoxide. Then, hydrogen and carbon monoxide gases and elemental sulfur are separated. These can be separately collected by a cyclone or a gravity dust collector at the rear end of the reactor, thereby simplifying the whole system apparatus, and reducing the facility cost. Further, since the combustible gas does not include a sulfur compound, a device corrosion can be inhibited. Also, it is possible to reduce the maintenance cost by generating additional combustible gases from the hydrogen sulfide and the carbonyl sulfide and collecting high value-added elemental sulfur.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
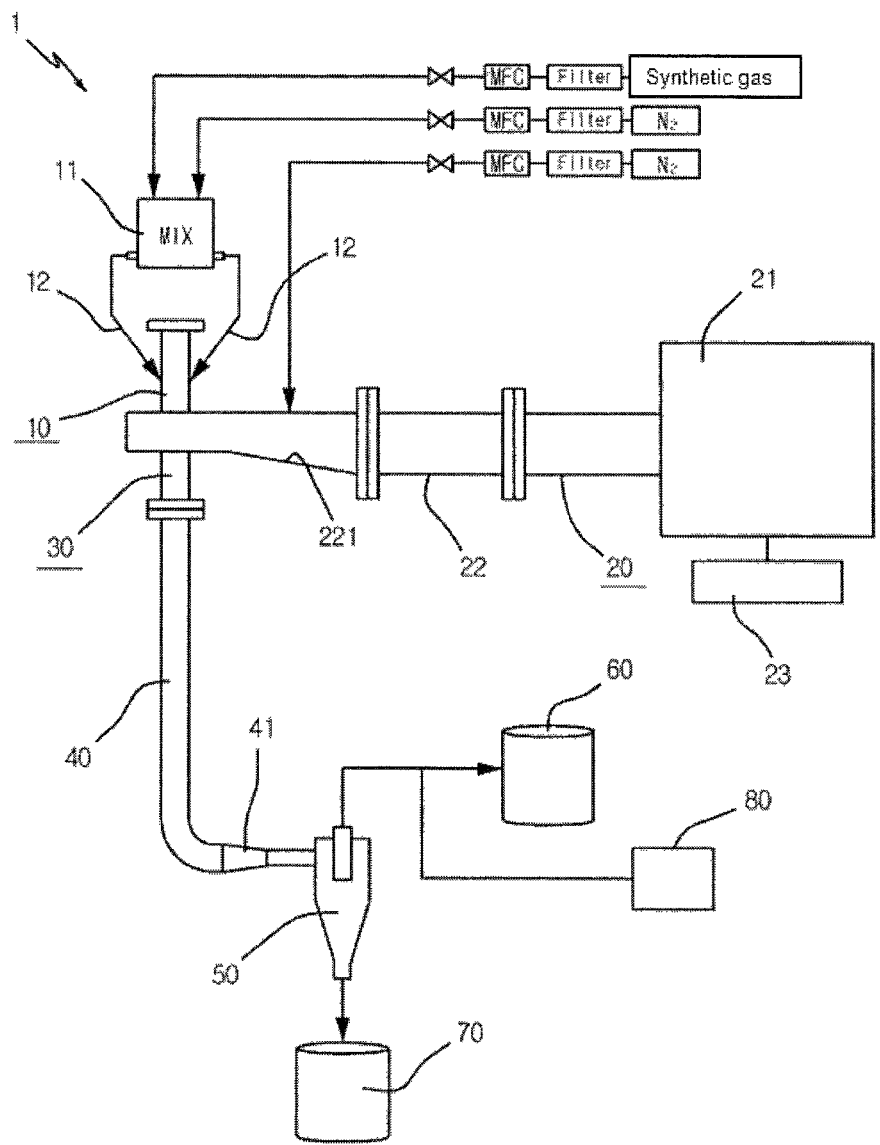
FIG. 1 is a view illustrating a configuration of a hydrogen sulfide and carbonyl sulfide removal apparatus using microwave plasma, according to the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

Hereinafter, the present invention will be described in detail with reference to accompanying drawings.

Figure 2:
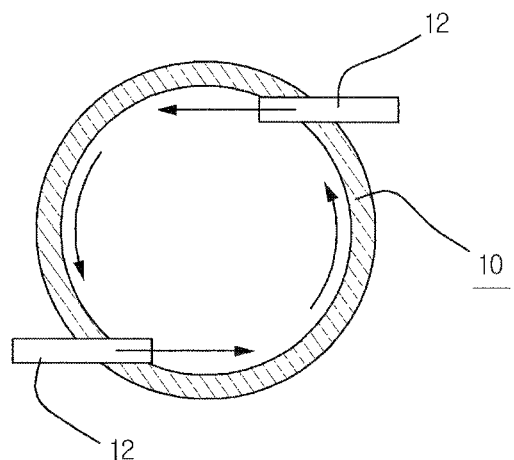
FIG. 2 is a schematic view illustrating the binding state of a hydrogen sulfide and carbonyl sulfide supply chamber with a mixed-gas supply pipe according to the present invention.
Figure 3:
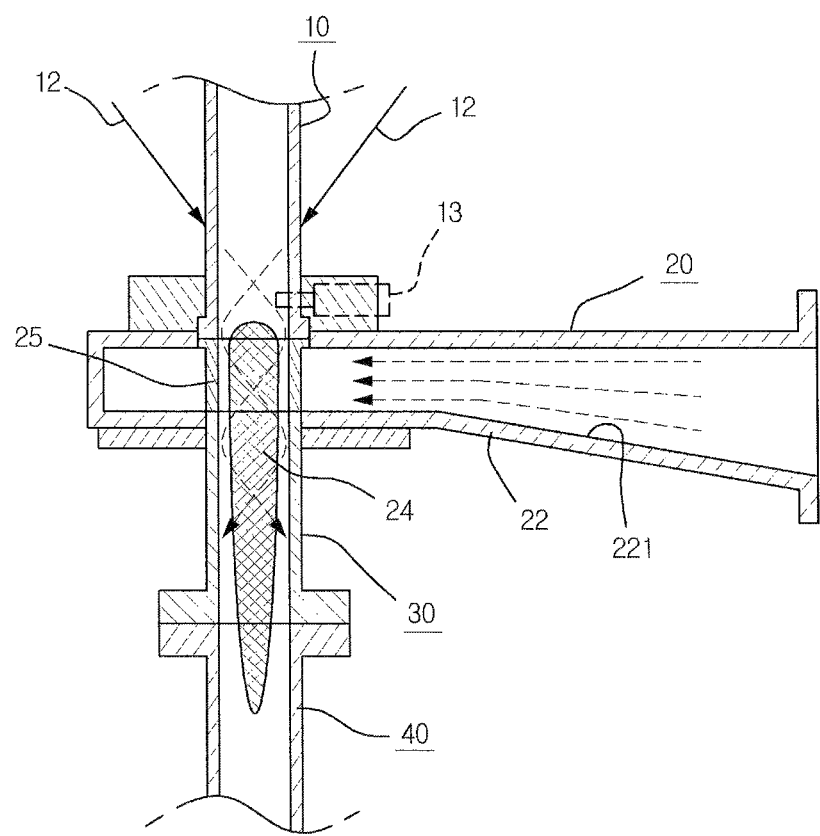
FIG. 3 is a view illustrating the state of action of microwave plasma in a hydrogen sulfide and carbonyl sulfide removal apparatus according to the present invention.

FIG. 1 is a view illustrating a configuration of a microwave plasma apparatus, according to the present invention; FIG. 2 is a schematic view illustrating the binding state of a hydrogen sulfide and carbonyl sulfide supply chamber with a mixed-gas supply pipe according to the present invention; and FIG. 3 is a view illustrating the action state of a sulfur compound removal apparatus using microwave plasma, according to the present invention.

Referring to drawings, the inventive hydrogen sulfide and carbonyl sulfide removal apparatus 1 using microwave plasma is configured in such a manner that a hydrogen sulfide and carbonyl sulfide supply chamber 10, a plasma decomposition chamber 30, and a rebinding chamber 40 are provided on the same vertical axis.

The hydrogen sulfide and carbonyl sulfide supply chamber 10 is supplied with plasma generating gas, and is provided an igniter 13 at one side thereof, in which the supplied gas is ignited and flame is generated. As the plasma generating gas, nitrogen, air, oxygen, steam, argon or the like may be supplied. Each gas supply line may be provided with a filter for removing foreign substances within gas, a flow controller for controlling the amount of supplied gas, and a valve for controlling the gas supply line.

The plasma generating gas supplied to the hydrogen sulfide and carbonyl sulfide supply chamber 10 may be one kind of gas or a mixture of various kinds of gases. Further, the plasma generating gas may be supplied alone or supplied through a mixed-gas supply pipe 12 after being mixed with synthetic gas including hydrogen sulfide and carbonyl sulfide in a mixing device 11 as shown in the drawing.

Herein, the mixed-gas supply pipe 12 communicated with the hydrogen sulfide and carbonyl sulfide supply chamber 10 may be configured alone. Otherwise, a plurality of the mixed-gas supply pipes 12 may be provided at equal intervals according to the circumference of the hydrogen sulfide and carbonyl sulfide supply chamber so that the mixed-gas can be supplied through them at once.

Also, the mixed-gas supply pipe 12 is provided in such a manner that it can be laterally apart from the axial center of the hydrogen sulfide and carbonyl sulfide supply chamber 10, as shown in FIG. 2, and toward the bottom of the hydrogen sulfide and carbonyl sulfide supply chamber 10, as shown in FIG. 3. This allows the supplied mixed-gas to be moved as a swirl stream swirling at a high rate on the inner surface of the hydrogen sulfide and carbonyl sulfide supply chamber. In other words, this structure inhibits the supplied mixed-gas from vertically colliding with the inner surface of the hydrogen sulfide and carbonyl sulfide supply chamber 10, thereby minimizing a reduction of flow velocity. Thus, it is possible to supply gas at a high rate. As described above, when the gas flow rate is high, a plasma flame 24 to be generated in a later process may have a long length. This increases the time when hydrogen sulfide and carbonyl sulfide included in the synthetic gas in the mixed-gas are in contact with the high temperature plasma, thereby allowing hydrogen sulfide and carbonyl sulfide to be easily dissociated (decomposed) into atomic units.

The supplied plasma generating gas is supplied to the plasma decomposition chamber 30 by passing through a waveguide 22 of a plasma generating device 20 while swirling in the hydrogen sulfide and carbonyl sulfide supply chamber 10.

Herein, the plasma generating device 20 includes a microwave source 21 for generating microwaves, and the waveguide 22 linked with the microwave source.

Examples of the microwave source 21 may include a magnetron which generates microwaves by being supplied with power supply. Also, at one side, a plasma controller 23 is provided so as to control generation output of the microwaves.

Also, the microwaves generated from the microwave source are moved to one side by the waveguide 22. The waveguide is horizontally formed so that the generated microwaves can be horizontally moved. Also, at one side of the waveguide, a taper portion 221 is formed so as to condense the moving microwaves with a high density. This can increase an output electric field to the maximum.

In the waveguide 22 horizontally piped as described above, at the end upper portion where generated microwaves are condensed with a high density, the hydrogen sulfide and carbonyl sulfide supply chamber 10 is communicatedly provided, and at the end lower portion, on the same axis of the end upper portion, the plasma decomposition chamber 30 is communicatedly provided. Also, a portion near to the hydrogen sulfide and carbonyl sulfide supply chamber and the plasma decomposition chamber is communicated with a nitrogen supply pipe so that inner pressure of the waveguide can be a high pressure that is the same or similar to the pressure of the hydrogen sulfide and carbonyl sulfide supply chamber 10 or the plasma decomposition chamber 30. This prevents the plasma generating gas moving from the hydrogen sulfide and carbonyl sulfide supply chamber to the plasma decomposition chamber from dispersing toward the inside of the waveguide.

Also, in the waveguide 22, at the end portion where the generated microwaves are condensed with a high density, a quartz pipe 25 is vertically provided. At the upper end of the quartz pipe, the hydrogen sulfide and carbonyl sulfide supply chamber 10 may be communicatedly provided, and at the lower end, on the same axis of the upper end, the plasma decomposition chamber 30 may be communicatedly provided. This allows the mixed-gas supplied through the hydrogen sulfide and carbonyl sulfide supply chamber to be supplied only to the plasma decomposition chamber without dispersion toward the waveguide. Further, the quartz pipe is made of a different material from the metal material for the gas supply chamber or a fuel supply chamber because a pipe made of a metal material may be heated and fused by microwaves with a high density.

The communication among the waveguide 22, the hydrogen sulfide and carbonyl sulfide supply chamber 10, and the plasma decomposition chamber 30 makes it easy to generate plasma by microwaves. Beside the communicated form as shown in the drawing, the hydrogen sulfide and carbonyl sulfide supply chamber 10 and the plasma decomposition chamber 30 may be formed as one chamber, and this chamber may be piped by being inserted through the waveguide in such a manner that an electric field can be formed within the chamber by microwaves.

The plasma generating gas passing through the waveguide 22 is placed in a dissociated state where binding of gas molecules is broken, by the electric field applied by the waveguide, and then forms the plasma flame by plasma discharge. The plasma flame is longitudinally formed within the plasma decomposition chamber 30 by fluid flow at a high rate.

Within the plasma decomposition chamber 30, the plasma flame 24 longitudinally formed by the plasma generating device is positioned. Accordingly, the synthetic gas including hydrogen sulfide and carbonyl sulfide that is supplied by being mixed with the plasma generating gas is placed in a dissociated state by being in contact with the plasma flame within the plasma decomposition chamber while its molecular bindings are broken. In other words, hydrogen sulfide ($H_2S$) is dissociated into $H_2$ and S, carbonyl sulfide (COS) is dissociated into CO and S, and other components of the synthetic gas, such as $H_2$ and CO, that have been also supplied, are separately dissociated into atomic units.

The dissociated atoms are bound to each other by passing through a rebinding chamber 40 communicatedly provided at the lower end of the plasma decomposition chamber. Herein, since the binding force between H—H, C—O, and N—N is stronger than that between H—S, C—S, O—S, and N—S, combustible gases of $H_2$ and CO, and solid sulfur (S) are separately obtained through the rebinding chamber. In other words, in view of only hydrogen sulfide and carbonyl sulfide, when atoms are rebound after dissociation by plasma, $H_2$, CO and solid sulfur (S) are collected. As a result, combustible gases and high value-added solid sulfur can be additionally collected.

Also, the pressure of an inner flow path including the rebinding chamber is controlled by a flow controller so that the generated gas and the solid sulfur (S) can be discharged through an outlet 41 by being moved to the lower end of the rebinding chamber.

The combustible gases and the solid sulfur discharged through the outlet are separated by a cyclone 50. Then, the combustible gases and the solid sulfur (S), separated from each other, are collected in a synthetic gas collecting tank 60 and a sulfur collecting tank 70, respectively. Herein, the combustible gases may be utilized while directly supplied to a device to be used such as a gas engine.

Herein, the gas component separated by the cyclone 50 may be analyzed by a component analyzer 80. According to the analysis value, the amount of the plasma generating gas to be supplied or the amount of the synthetic gas to be supplied may be adjusted, or microwave generation output of the plasma generating device may be adjusted. These controls may be performed by an additional control unit. Herein, the plasma controller may constitute the control unit.

Figure 4:
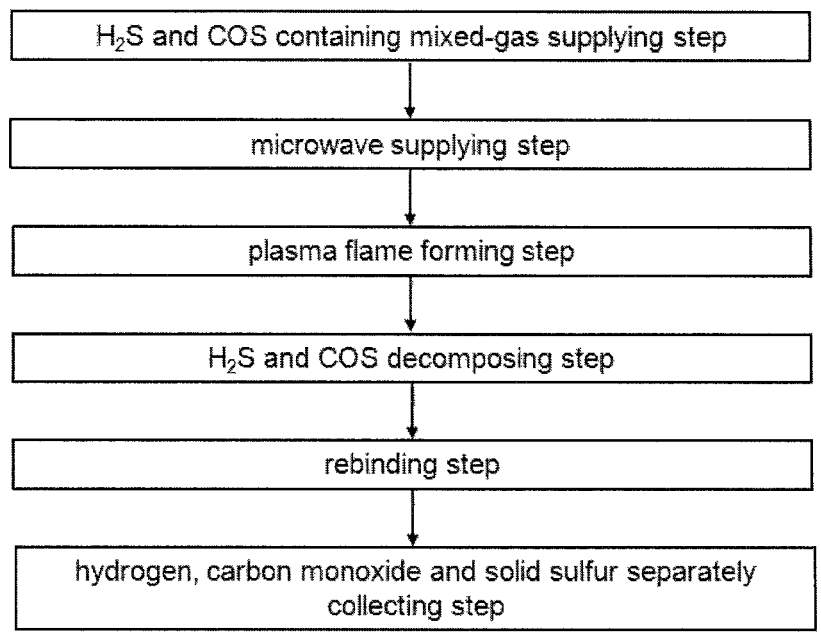
FIG. 4 is a block diagram showing processes in a hydrogen sulfide and carbonyl sulfide removal method according to the present invention.

Further, referring to FIG. 4, as described above, in the inventive sulfur compound removal method using the hydrogen sulfide and carbonyl sulfide removal apparatus, a hydrogen sulfide and carbonyl sulfide-containing mixed gas supplying step is performed in which a mixed-gas including plasma generating gas with synthetic gas including hydrogen sulfide and carbonyl sulfide is swirlingly supplied into a hydrogen sulfide and carbonyl sulfide supply chamber. This step may include a gas mixing step in which the synthetic gas and the plasma generating gas can be relatively uniformly mixed through sufficient mixing by a mixing device.

Then, a microwave supplying step is performed in which microwaves generated from a plasma generating device are supplied to the supplied mixed-gas.

Then, a plasma flame forming step is performed in which, by an electric field formed by the supplied microwaves, molecules of the plasma generating gas in the mixed-gas are dissociated and form plasma flame by plasma discharge through an igniter. The plasma flame is longitudinally formed within the chamber while the mixed-gas is swirlingly supplied at high pressure.

Then, a hydrogen sulfide and carbonyl sulfide decomposing step is performed in which, when the synthetic gas including hydrogen sulfide and carbonyl sulfide is passed through the plasma flame, hydrogen sulfide and carbonyl sulfide included in the synthetic gas are dissociated into atomic units such as sulfur, hydrogen, and carbon monoxide.

Next, in a rebinding step, the hydrogen and other combustible gases, dissociated as described above, are escaped from the plasma flame and passed through a rebinding chamber while their re-bindings are carried out in the order of a higher binding force to a lower binding force. Then, combustible gases of hydrogen, and carbon monoxide gas are generated, and the sulfur in a solid state is moved or cohered.

Then, in a separately collecting step, the hydrogen and carbon monoxide gases and the solid sulfur are separated by a cyclone, and then, they are separately collected by collecting tanks, respectively. Thus, hydrogen sulfide and carbonyl sulfide included in the synthetic gas are decomposed by the microwave plasma and then combustible gases of hydrogen and carbon monoxide, and solid sulfur are additionally collected or separately removed. Then, almost all hydrogen sulfide and carbonyl sulfide within the synthetic gas can be removed. This allows the synthetic gas at a high temperature to be immediately supplied to a gas engine or a gas generator and used. Accordingly, it is possible to significantly reduce an additional heating step for raising a gas temperature, thereby improving heat efficiency.

Hereinafter, the present invention will be described with reference to Examples.

Example 1

The inventive hydrogen sulfide and carbonyl sulfide removal apparatus using microwave plasma, as shown in FIG. 1, was used in a test for removing hydrogen sulfide and carbonyl sulfide.

In order to easily determine if hydrogen sulfide and carbonyl sulfide are decomposed, instead of a synthetic gas including hydrogen and carbon monoxide, a mixed-gas obtained by diluting hydrogen sulfide and carbonyl sulfide in nitrogen gas was used as a virtual synthetic gas.

The concentration of hydrogen sulfide gas within the nitrogen gas was set from 300 ppm to a maximum of 1500 ppm, and the concentration of carbonyl sulfide gas within the nitrogen gas was set from 30 ppm to a maximum of 300 ppm. In other words, on the assumption of unfavorable condition, the concentrations of hydrogen sulfide and carbonyl sulfide were set to be similar or twice or more higher levels than those (600 ppm and 100 ppm) of hydrogen sulfide and carbonyl sulfide contained in a synthetic gas generated from a general coal gasification process.

Herein, the flow rate of gas to be injected was fixed as 16 L per min, and after formation of plasma flame, qualitative and quantitative analysis of the gas was performed using GC (PFPD). When hydrogen sulfide, and carbonyl sulfide were decomposed using microwave plasma, the results according to plasma power and the concentrations of hydrogen sulfide and carbonyl sulfide gases are shown in FIGS. 5, 6, 7, and 8.

Figure 5:
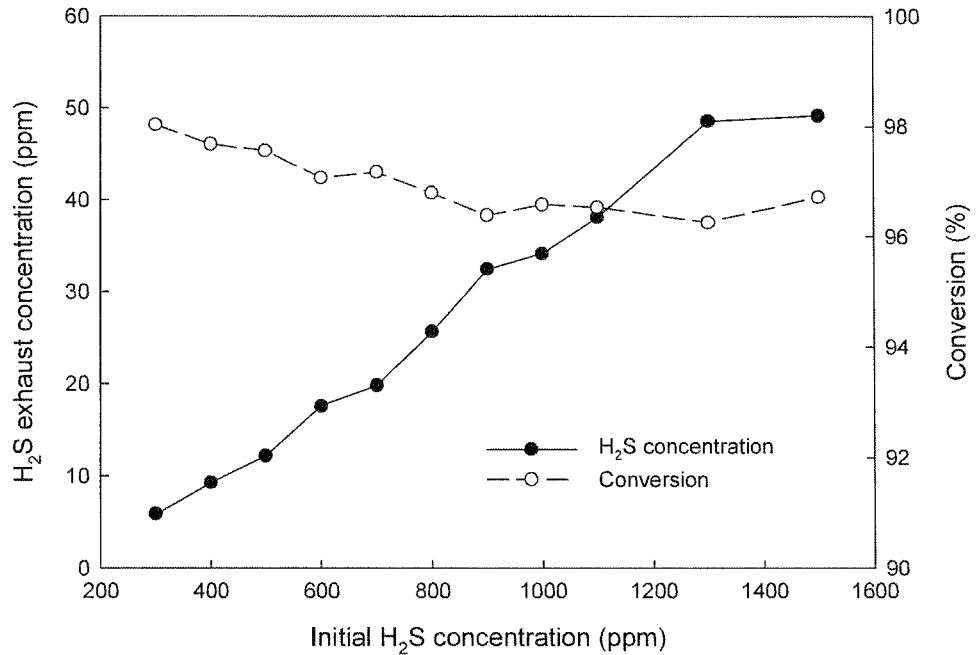
FIG. 5 is a view illustrating a change of a decomposition rate of hydrogen sulfide through microwave plasma according to concentrations of the hydrogen sulfide in the present invention.

Referring to FIG. 5, when hydrogen sulfide-containing gas at 300 ppm to 1500 ppm was passed through plasma flame under a condition of plasma power of 1.6 kW, it was found that 98% to 96% of hydrogen sulfide was decomposed to 5 ppm to 50 ppm.

Figure 6:
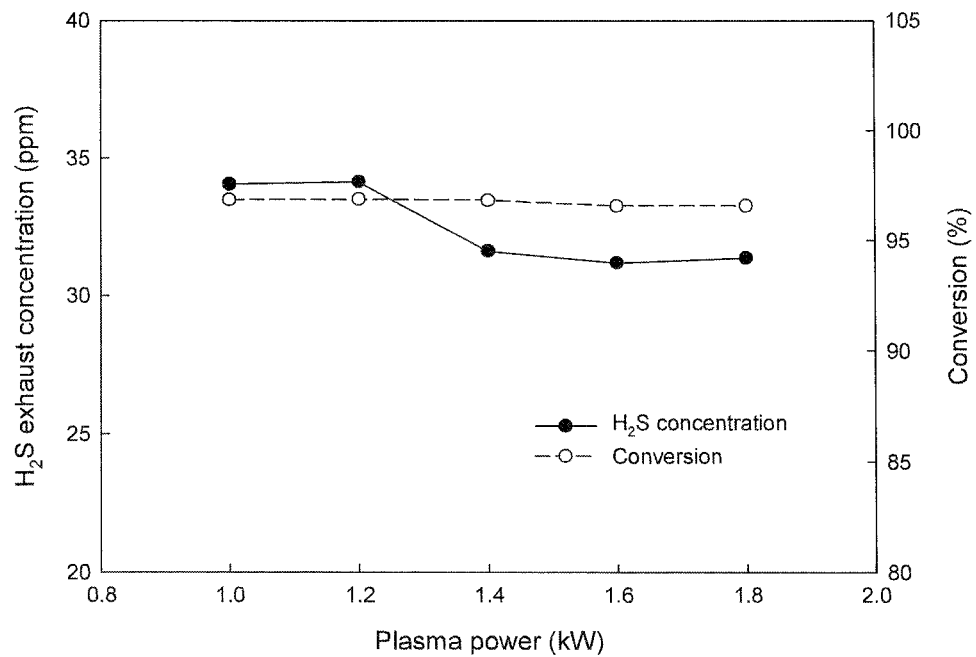
FIG. 6 is a view illustrating a change of a decomposition rate of hydrogen sulfide according to a change in microwave power in the present invention.

Referring to FIG. 6, when hydrogen sulfide-containing gas at 1000 ppm was passed through plasma flame by varying microwave power from 1.0 kW to 1.8 kW, it was possible to obtain a hydrogen sulfide decomposition rate of 97% even at low plasma power of 1.0 kW.

Figure 7:
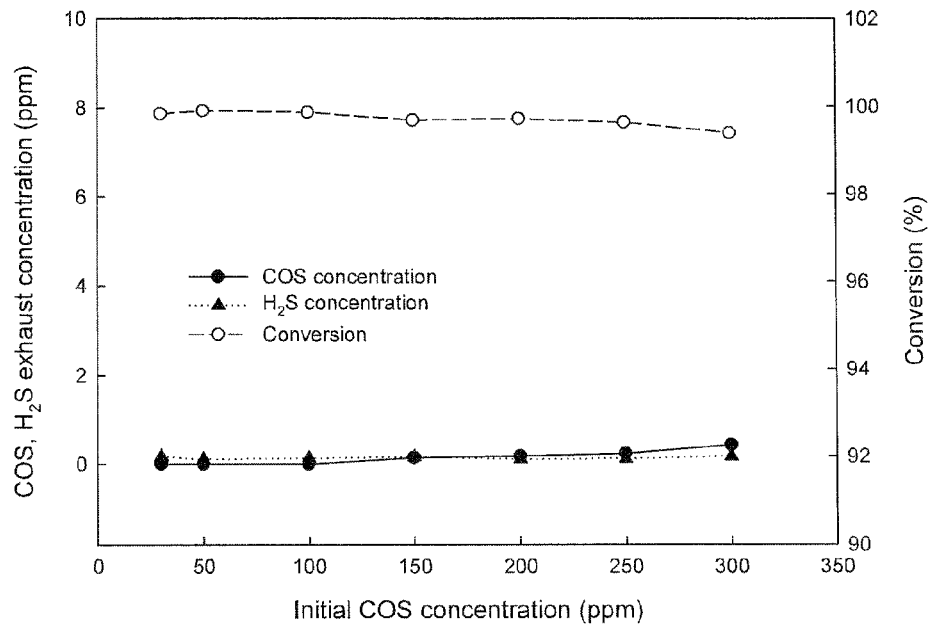
FIG. 7 is a view illustrating a change of a decomposition rate of carbonyl sulfide through microwave plasma according to concentrations of the carbonyl sulfide in the present invention.

Referring to FIG. 7, when carbonyl sulfide-containing gas at 30 ppm to 300 ppm passed through plasma flame under a condition of plasma power of 1.6 kW, it was found that 99% or more of carbonyl sulfide was decomposed to 0 ppm to 0.4 ppm. Especially, besides the decomposition of carbonyl sulfide, hydrogen sulfide at about 0.1 ppm was produced.

Figure 8:
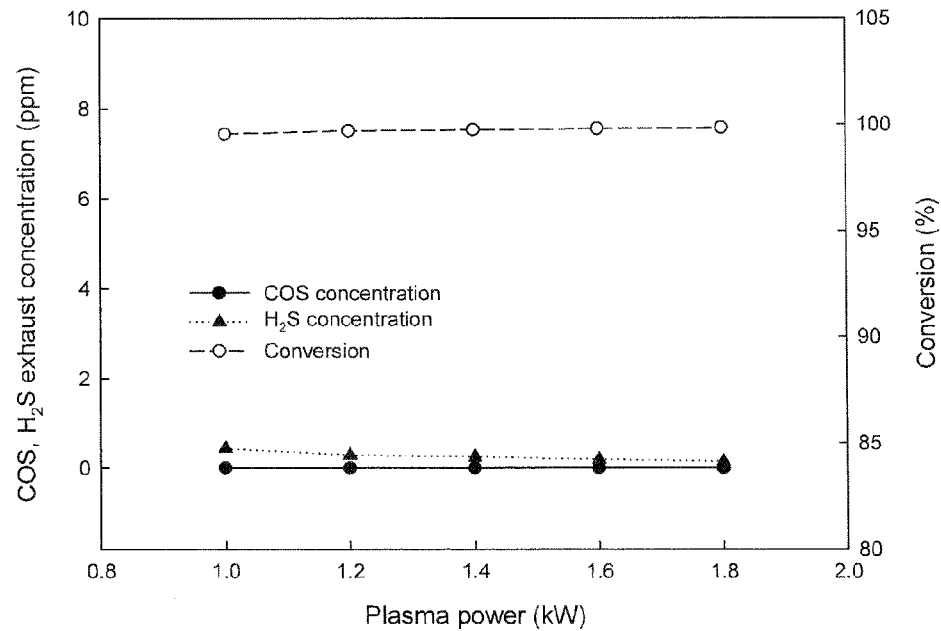
FIG. 8 is a view illustrating a change of a decomposition rate of carbonyl sulfide according to a change in microwave power in the present invention.

Referring to FIG. 8, when carbonyl sulfide-containing gas at 100 ppm was passed through plasma flame by varying microwave power from 1.0 kW to 1.8 kW, it was possible to obtain a carbonyl sulfide decomposition rate of 99% or more even at low plasma power of 1.0 kW. Also, besides the decomposition of carbonyl sulfide, hydrogen sulfide at about 0.1 ppm to 0.4 ppm was produced. Herein, by increasing the microwave power, the produced hydrogen sulfide can be decomposed, thereby improving the removal efficiency.

Accordingly, in a case where hydrogen sulfide and carbonyl sulfide within the gas to be treated have high concentrations, in order to secure high hydrogen sulfide and carbonyl sulfide decomposition rates at concentrations appropriate for post processes, high plasma power is required.

Preferably, in a coal gasification process of producing a synthetic gas containing hydrogen sulfide and carbonyl sulfide at a rate of 16 L per min, in order to treat or remove 99% or more of hydrogen sulfide with high cleanliness, it can be assumed that about 2.0 kW of plasma power is proper.

Example 2

Under a condition of microwave power of 1.6 kW, a synthetic gas including $H_2S$ at 1000 ppm, and COS at 100 ppm, and $N_2$ as a carrier gas and a plasma generating gas were used in a test for removing a mixed-gas of hydrogen sulfide and carbonyl sulfide in the same manner as described in Example 1. The test result is shown in FIG. 9.

Figure 9:
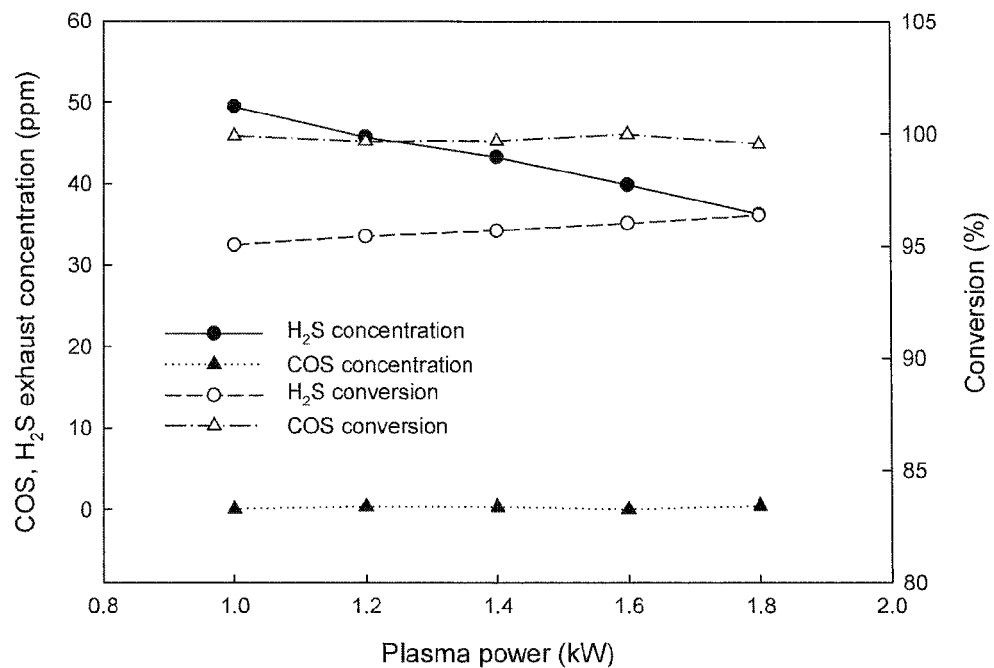
FIG. 9 is a view illustrating a change of a decomposition rate of mixed-gas including hydrogen sulfide and carbonyl sulfide according to a change in microwave power in the present invention.

Referring to FIG. 9, it can be seen that when hydrogen sulfide is mixed with carbonyl sulfide, the decomposition activity of the carbonyl sulfide was similar that in Example 1, and the decomposition activity of the hydrogen sulfide was lower than that in Example 1 by about 0.5% to 1.5%.

Figure 10:
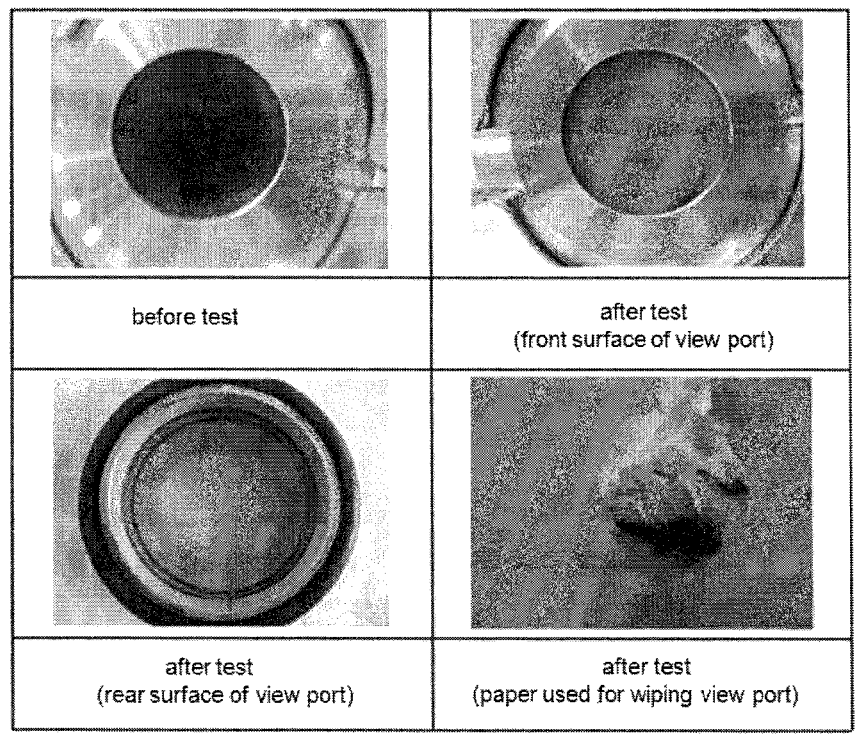
FIG. 10 is a photograph showing solid sulfur collected according to an Example according to the present invention.

Also, FIG. 10 is a photograph showing solid sulfur collected in a sulfur collecting tank after the test of removing hydrogen sulfide and carbonyl sulfide. Referring to FIG. 10, since solid sulfur is adhered on the inner wall after the test, it can be found that solid sulfur was separated by plasma.

Although a preferred embodiment of the present invention has been described for illustrative purposes, those skilled in the art will appreciate that partial modifications are possible, without departing from the scope of the invention.

Korean patent application No. 10-2011-0021000, filed on Mar. 9, 2011, is incorporated herein by reference in its entireties for all purposes.

What is claimed is:

1. A hydrogen sulfide and carbonyl sulfide removal method using microwave plasma by using
    an apparatus comprising a hydrogen sulfide and carbonyl sulfide supply chamber as a vertical pipe, to which a mixed-gas comprising (1) a synthetic gas generated from gasification of hydrocarbon fuel and comprising the hydrogen sulfide and the carbonyl sulfide, and (2) a plasma generating gas are supplied;
    a plasma generating device for moving microwaves generated from a waveguide, as a horizontal pipe, to a portion communicated to the hydrogen sulfide and carbonyl sulfide supply chamber, dissociating the supplied plasma generating gas by increasing an electric field through high-density condensation of the microwaves, and forming plasma flame by plasma discharge, an end upper portion of the waveguide being communicated with the hydrogen sulfide and carbonyl sulfide supply chamber;
    a plasma decomposition chamber, as a vertical pipe, which is communicated with an end lower portion of the waveguide of the plasma generating device and is connected on the same axis as that of the hydrogen sulfide and carbonyl sulfide supply chamber, wherein within the plasma decomposition chamber, the plasma flame is positioned where the supplied hydrogen sulfide and the carbonyl sulfide are put and decomposed in the plasma flame;
    a rebinding chamber, as a vertical pipe, which is communicatedly combined with a lower end of the plasma decomposition chamber, wherein hydrogen and carbon monoxide generated from decomposition of the hydrogen sulfide and the carbonyl sulfide by the plasma flame, are obtained as combustible gases separate from solid sulfur;
    a cyclone for separating the combustible gases and solid sulfur, which is provided at a lower end of the rebinding chamber; and
    a synthetic gas collecting tank and a sulfur collecting tank for collecting the combustible gases of hydrogen and carbon monoxide, and the solid sulfur separated by the cyclone, respectively; and the method comprising:
    a step for supplying the mixed-gas in a swirling manner to the hydrogen sulfide and carbonyl sulfide supply chamber;
    a step for supplying the microwaves generated from the plasma generating device to the supplied mixed-gas;
    a step for forming plasma flame, in which by an electric field of the supplied microwaves, molecules of the plasma generating gas in the mixed-gas are dissociated and form the plasma flame by plasma discharge;
    a step for decomposing hydrogen sulfide and carbonyl sulfide, in which while the synthetic gas comprising the hydrogen sulfide and the carbonyl sulfide is passed through the plasma flame, the hydrogen sulfide and the carbonyl sulfide are dissociated into atomic units;
    a rebinding step, in which the atomic units dissociated in the hydrogen sulfide and carbonyl sulfide decomposing step, are rebound so that combustible gases of the hydrogen and the carbon monoxide are generated, and the sulfur in a solid state is cohered; and
    a collecting step, in which the gases of the hydrogen and carbon monoxide and the solid sulfur are separated by the cyclone, and then are separately collected, respectively.

2. The method of claim 1, wherein the plasma generating device comprises:
    a microwave source for generating the microwaves by power supply;
    the waveguide, as the horizontal pipe, for moving the microwaves generated from the microwave source to one side, which is formed with a taper portion for maximizing an output electric field by condensing the microwaves in movement with a high density; and
    a plasma controller for controlling generation output of the microwaves of the microwave source.

3. The method of claim 1, wherein the plasma generating gas comprises nitrogen, oxygen, air, steam, or argon, the synthetic gas comprising the hydrogen sulfide and the carbonyl sulfide is mixed with the plasma generating gas by a mixing device, and a mixed-gas supply pipe for supplying a mixed-gas comprising the synthetic gas with the plasma generating gas is provided in such a manner that the mixed-gas supply pipe is positioned toward a bottom laterally apart from axial center of the hydrogen sulfide and carbonyl sulfide supply chamber, wherein the supplied gas is swirlingly moved within the chamber at a high rate.

* * * * *